United States Patent
Hida et al.

(10) Patent No.: US 10,717,224 B2
(45) Date of Patent: Jul. 21, 2020

(54) METHOD OF MANUFACTURING PRODUCT WITH SKIN

(71) Applicant: TOYODA GOSEI CO., LTD., Kiyosu-shi, Aichi-ken (JP)

(72) Inventors: Yumi Hida, Kiyosu (JP); Masahiro Yoshikawa, Kiyosu (JP); Kenichi Furuta, Kiyosu (JP); Hideyuki Miura, Kiyosu (JP); Akira Maeda, Kiyosu (JP); Shingo Yokota, Kiyosu (JP); Takuya Ueno, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 315 days.

(21) Appl. No.: 15/690,632

(22) Filed: Aug. 30, 2017

(65) Prior Publication Data
US 2018/0065291 A1   Mar. 8, 2018

(30) Foreign Application Priority Data

Sep. 5, 2016 (JP) ................................. 2016-172601
Nov. 28, 2016 (JP) ................................. 2016-229765

(51) Int. Cl.
| | | |
|---|---|---|
| *B29C 51/14* | (2006.01) | |
| *B29C 51/10* | (2006.01) | |
| *B29C 51/26* | (2006.01) | |
| *B29K 101/12* | (2006.01) | |

(Continued)

(52) U.S. Cl.
CPC .............. *B29C 51/14* (2013.01); *B29C 51/10* (2013.01); *B29C 51/266* (2013.01); *B29C 51/268* (2013.01); *B29K 2023/06* (2013.01); *B29K 2101/12* (2013.01); *B29K 2105/04* (2013.01); *B29L 2031/302* (2013.01)

(58) Field of Classification Search
None
See application file for complete search history.

(56) References Cited

U.S. PATENT DOCUMENTS 5,746,870 A * 5/1998 Tomioka ................. B29C 51/16
156/267

FOREIGN PATENT DOCUMENTS

| JP | S60-036214 U | 3/1985 |
|---|---|---|
| JP | S60-062924 U | 5/1985 |
| JP | 2007-160595 A | 6/2007 |

OTHER PUBLICATIONS

Office Action dated Nov. 19, 2019 issued in corresponding JP patent application No. 2016-229765 (and English translation).

* cited by examiner

*Primary Examiner* — Monica A Huson
(74) *Attorney, Agent, or Firm* — Posz Law Group, PLC

(57) ABSTRACT

A method of manufacturing a product with skin includes: attaching a preformed base material to a vacuum forming die on a back surface of the base material, disposing a skin material as a material of the skin on a front surface of a base material, and sucking the skin material through the vacuum forming die and the base material to deform a main portion of skin material so as to be in close contact with the front surface of the base material; cutting a surplus portion of the skin material not being in close contact with the front surface of the base material with a trim blade so that a distal end portion remains around the main portion, thereby forming the skin having the distal end portion; and winding the distal end portion of the skin around the back surface of the base material by a winding mechanism.

7 Claims, 10 Drawing Sheets

(51) Int. Cl.
*B29K 105/04* (2006.01)
*B29L 31/30* (2006.01)

METHOD OF MANUFACTURING PRODUCT WITH SKIN

CROSS-REFERENCE TO RELATED APPLICATION(S)

This application is based upon and claims the benefit of priority from Japanese Patent Application No. 2016-172601, filed on Sep. 5, 2016, and Japanese Patent Application No. 2016-229765, filed on Nov. 28, 2016, the entire contents of which are incorporated herein by reference.

BACKGROUND

1. Field of the Invention

The present invention relates to a method of manufacturing a product with skin in which a main portion of the skin covers a front surface of a base material and a distal end portion around the main portion of the skin is wound around a back surface of the base material.

2. Description of the Related Art

As a method of manufacturing this type of product with skin, there is known a method in which a shaping process, a trimming process and a winding process are sequentially performed (see, for example, JP-A-2007-160595).

In the shaping process, a preformed base material is attached to a vacuum forming die on the back surface of the base material, and a skin material which is a material of the skin is disposed on the front surface of the base material. By sucking the skin material through the vacuum forming die and the base material, the main portion of the skin material is deformed so as to be in close contact with the front surface of the base material.

In the trimming process, while the base material is kept attached to the vacuum forming die, the surplus portion of the skin material which is not in close contact with the front surface of the base material is cut by a trim blade so that the distal end portion remains around the main portion. By the cutting, the skin having a distal end portion is formed.

In the winding process, the intermediate product subjected to the trimming process is transferred to a dedicated jig from the vacuum forming die, and the distal end portion of the skin is bent by the jig and is wound around the back surface of the base material.

However, in the manufacturing method described in JP-A-2007-160595, it is expensive to introduce the dedicated jig for winding the distal end portion of the skin. Further, when winding the distal end portion of the skin, there is a need for a step of transferring the intermediate product subjected to the trimming process from the vacuum forming die to the jig, and there is also a problem that the number of manufacturing steps increases accordingly.

SUMMARY

The present invention has been made in view of such circumstances, and an object thereof is to provide a product with skin in which the distal end portion of the skin is wound around the base material, without transferring an intermediate product subjected to the trimming process.

According to an aspect of the invention, there is provided a method of manufacturing a product with skin in which a main portion of skin covers a front surface of a base material, and a distal end portion around the main portion of the skin is wound around a back surface of the base material, the method including: attaching a preformed base material to a vacuum forming die on the back surface of the base material, disposing a skin material as a material of the skin on the front surface of the base material, and then sucking the skin material through the vacuum forming die and the base material to deform the main portion of the skin material so as to be in close contact with the front surface of the base material; cutting a surplus portion of the skin material not being in close contact with the front surface of the base material with a trim blade so that the distal end portion remains around the main portion, while keeping the base material in the state of being attached to the vacuum forming die, thereby forming the skin having the distal end portion; and winding the distal end portion of the skin around the back surface of the base material by a winding mechanism, while keeping the base material in the state of being attached to the vacuum forming die.

According to the manufacturing method, after the shaping process and the trimming process are sequentially performed using the vacuum forming die, the winding process is performed using the vacuum forming die. Thus, a product with skin is manufactured in which the main portion of the skin is covered on the front surface of the base material and the distal end portion of the skin is wound around the back surface of the base material. In this manner, the shaping process, the trimming process and the winding process are performed, in a state where the base material is attached to the vacuum forming die, in other words, using a common vacuum forming die. Therefore, a dedicated jig is unnecessary unlike the case where the winding process is performed using a dedicated jig provided separately from the vacuum forming die. In addition, it is not necessary to transfer the intermediate product subjected to the trimming process from the vacuum forming die to a dedicated jig for winding the distal end portion.

In the manufacturing method of the invention, a material having a flat boundary surface at a boundary portion between a back surface and a front surface may be used as the base material, a blade capable of reciprocating in a direction along the boundary surface is used as the trim blade; and when the skin having the distal end portion is formed, cutting may be performed by moving the trim blade along the boundary surface toward a side approaching the surplus portion and pressing the trim blade against the surplus portion.

Here, in the trimming process, if the surplus portion is cut so that the distal end portion remains around the main portion, by moving the trim blade in a direction orthogonal to the boundary surface of the base material, the distal end portion includes a portion which is adjacent to the main portion and orthogonal to the boundary surface, and a portion which is adjacent to the portion on the side opposite to the main portion and parallel to the boundary surface. The distal end portion becomes longer by the length of the parallel portion, and as a result, the distal end portion may be excessively elongated.

In this regard, according to the manufacturing method described above, a trim blade capable of reciprocating in the direction along the boundary surface of the base material is used. Then, in the trimming process, the trim blade is moved along the boundary surface toward the side of the surplus portion and pressed against the surplus portion. The surplus portion is cut and the distal end portion remains around the main portion. The distal end portion is constituted only by the portion adjacent to the main portion and orthogonal to the boundary surface. Therefore, the distal end portion has no portion parallel to the boundary surface, the distal end portion becomes shorter by the length of the portion, and it is possible to suppress the excessive elongation of the distal end portion.

In the manufacturing method of the invention, a peripheral edge portion of the base material may include a plurality of linear portions, and a plurality of curved corner portions connecting the adjacent linear portions and having a circumferential length shorter than the length of the linear portion, a first trim blade for cutting a portion of the surplus portion of the skin material corresponding to the linear portion of the base material, and a second trim blade for cutting a portion thereof corresponding to the corner portion of the base material may be used as the trim blade, and when the skin having the distal end portion is formed, the surplus portion may be cut by the first trim blade after cutting the surplus portion by the second trim blade while sucking the skin material by evacuation.

Here, if the cutting of the surplus portion by the first trim blade and the cutting of the surplus portion by the second trim blade adjacent to the first trim blade are performed at the same time, interference between the first trim blade and the second trim blade is unlikely to occur.

According to the manufacturing method, the cutting by the first trim blade and the cutting by the second trim blade are performed at different timings. Therefore, interference between the first trim blade and the second trim blade is hardly occur.

Further, the cutting is performed in a state where the skin material is sucked by evacuation and the surplus portion is pulled toward the back surface of the base material.

However, when the surplus portion is cut while evacuating, air is considerably sucked from the cut portion. The force of pulling the surplus portion toward the back surface of the base material is lowered than that before cutting and the surplus portion tries to return to the shape before being pulled by evacuation.

As the length of the cut portion increases, the amount of air to be sucked increases, and the degree of reduction in the force of pulling the surplus portion toward the back surface of the base material increases. The length of the portion to be cut is shorter than that of the portion corresponding to the linear portion at the portion corresponding to the corner portion of the base material in the surplus portion. The cutting of the former portion is performed first by the second trim blade, and the cutting of the latter portion is performed later by the first trim blade. Therefore, the force of pulling the surplus portion toward the back surface of the base material before completion of the cutting of the surplus portion is hard to decrease as compared with the case where the cutting by the first trim blade is performed first and the cutting by the second trim blade is performed later. The surplus portion becomes hard to return to the shape before being pulled by evacuation. Along with this, the distal end portion formed by cutting the surplus portion also approaches the back surface of the base material.

Therefore, in the winding process performed subsequent to the trimming process, the distal end portion of the skin can be suitably wound around the back surface of the base material by the winding mechanism.

In the manufacturing method of the invention, when the distal end portion of the skin is wound around the back surface of the base material, the distal end portion may be pressed in a direction orthogonal to the boundary surface by the winding mechanism, and the distal end portion may be deformed to be in close contact with the back surface including the boundary surface of the base material, thereby winding the distal end portion.

According to the manufacturing method described above, in the winding process, the distal end portion of the skin is pressed in a direction orthogonal to the boundary surface of the base material by the winding mechanism in a state where the base material is attached to the vacuum forming die. The pressed distal end portion is deformed to be in close contact with the back surface including the boundary surface of the base material. In this way, the distal end portion of the skin is wound around the back surface of the base material without transferring the intermediate product subjected to the trimming process.

In the manufacturing method of the invention, the distal end portion of the skin may be wound around the back surface of the base material in a state in which an adhesive is applied to a predetermined location of the back surface of the base material in which at least the distal end portion is wound, and when the distal end portion of the skin is wound around the back surface of the base material, the operation of pressing and winding the distal end portion by the winding mechanism may be performed in a state in which the movement of the base material in a pressing direction is restricted.

Here, in order to firmly adhere the distal end portion pressed by the winding mechanism to the back surface of the base material coated with the adhesive, it is important that the distal end portion be strongly pressed against the base material.

In this regard, according to the manufacturing method, the movement of the base material in the direction in which the distal end portion is pressed by the winding mechanism is restricted. Since the distal end portion is pressed by the winding mechanism in this state, the distal end portion is strongly pressed against the base material. As a result, the distal end portion can strongly adhere (be pressed) to the back surface of the base material.

In the manufacturing method of the invention, a material having a rib formed at a location of the back surface different from a location where the distal end portion is closely contacts may be used as the base material, and when the distal end portion of the skin is wound around the back surface of the base material, by gripping the rib by a chuck mechanism provided on the vacuum forming die, movement of the base material in a direction in which the distal end portion is pressed by the winding mechanism may be restricted, and in this state, the distal end portion may be pressed and wound.

According to the manufacturing method, in the winding process, the ribs formed at a position different from a portion of the back surface of the base material with which the distal end portion is in close contact are gripped by a chuck mechanism provided in the vacuum forming die. The base material is restricted from moving in a direction in which the distal end portion is pressed by the winding mechanism.

In the manufacturing method of the invention, a mechanism including a plug, which forms a part of the vacuum forming die and is capable of reciprocating in a direction orthogonal to the boundary surface, may be used as the winding mechanism, when the main portion of the skin material is deformed, the plug may be moved to a position where the base material is supported from the back surface, when the skin having the distal end portion is formed, the plug may be retracted to a position deviated from a movement path of the trim blade, and when the distal end portion of the skin is wound around the back surface of the base material, the plug may be moved to a position where the base material is supported from the back surface.

According to the manufacturing method, the portion (remaining portion) of the vacuum forming die different from the plug supports the base material from the back surface thereof in any of the shaping process, the trimming process and the winding process.

Further, the plug forming part of each of the vacuum forming die and the winding mechanism operates as follows.

In the shaping process, the plug is moved to a portion where the base material is supported from the back surface. Therefore, it is possible to attach the base material to the plug of the vacuum forming die and the above-mentioned remaining portion.

In the trimming process, in a state in which the base material is attached to the remaining portion of the vacuum forming die, the plug is retreated to a position deviated from the movement path of the trim blade. Therefore, the plug is unlikely to hinder the cutting of the surplus portion by the trim blade.

In the winding process, the plug is moved to a position where the base material mounted on the remaining portion of the vacuum forming die is supported from the back surface. During this movement, the distal end portion of the skin is pressed toward the back surface of the base material by the plug, so that the winding is performed.

In the manufacturing method of the invention, a blade which has a plurality of teeth aligned in a row, and in which a tip of each tooth is pointed and valley portions between adjacent teeth are formed in a curved state such that an angle of the blade is uniform, may be used as the trim blade, and when the skin having the distal end portion is formed, cutting may be performed by pressing each tooth of the trim blade against the surplus portion.

Here, as a trim blade, when a blade is used in which a plurality of teeth forming a pointed triangular plate shape are formed in a state of being aligned in a row, and the angle of the blade at the valley portion of each tooth increases as approaching the root part of the tooth, there is a risk as follows. When each tooth is pressed against the surplus portion of the skin material, in the valley portion in which each tooth enters while cutting the skin, the surplus portion is hard to be cut as approaching to the root portion of the tooth and to be torn off. Accordingly there is a risk of generation of scraps.

In this respect, according to the manufacturing method described above, in the trimming process, the trim blade having the above configuration is used and each tooth is pressed against the surplus portion. Then, in the valley portion, since the angle of the blade is uniform, the surplus portion is uniformly cut irrespective of the part of the tooth. The surplus portion is cleanly cut in a state in which the distal end portion remains around the main portion without tearing the surplus portion off. It is difficult for scraps to be generated due to tearing off the surplus portion.

According to the method of manufacturing the product with skin, the distal end portion of the skin can be wound around the base material, without transferring the intermediate product subjected to the trimming process.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 1A to 1C are diagrams illustrating a first embodiment of a method of manufacturing a product with skin, wherein FIG. 1A is a partial cross-sectional view in which the part of a product with skin is omitted, FIG. 1B is an enlarged partial cross-sectional view of a part of FIG. 1A, and FIG. 1C is a plan view of the product with skin;

FIG. 9A is a partial cross-sectional view illustrating a case where the trim blade is moved in a direction along a boundary surface of a base material in the first embodiment, and FIG. 9B is a partial cross-sectional view illustrating a case where the trim blade is moved in a direction orthogonal to the boundary surface in the comparative example;

DETAILED DESCRIPTION OF THE INVENTION

First Embodiment

Hereinafter, a first embodiment of a method of manufacturing a product with a skin will be described with reference to FIGS. 1A to 9B.

<Products with Skin>

Figure 1A:
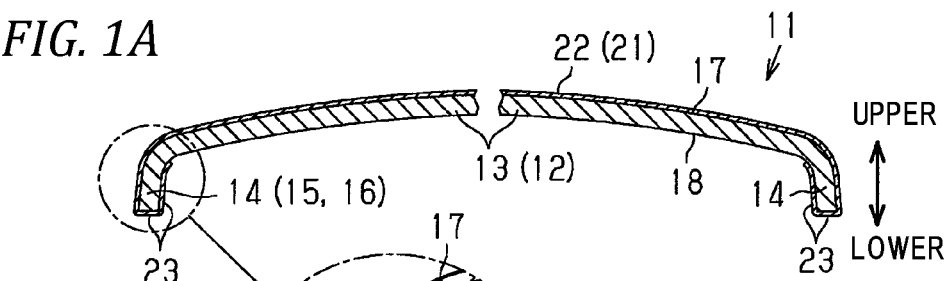
Figure 1B:
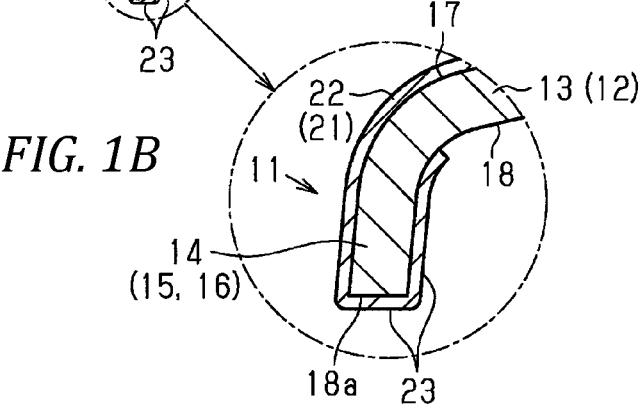
Figure 1C:
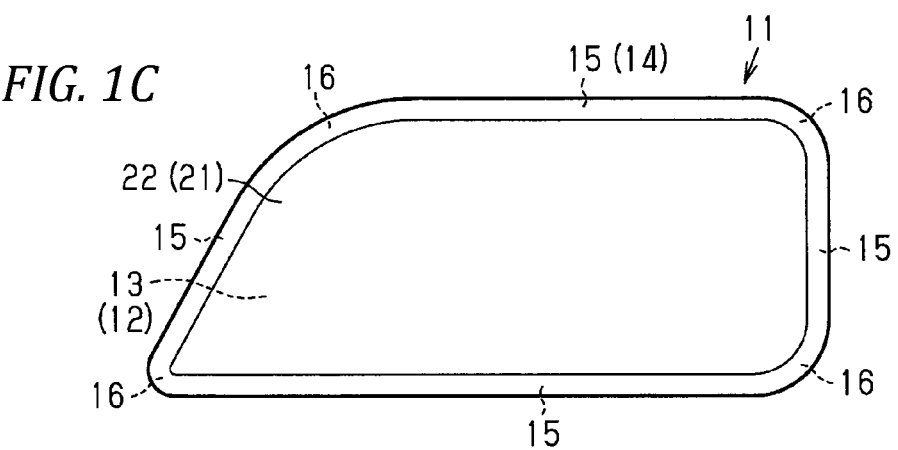

First, the product with skin manufactured by the manufacturing method of according to the first embodiment will be described. As illustrated in FIGS. 1A to 1C, the product with skin 11 is formed by covering a base material 12 forming a skeleton portion with skin 21 having good decorativeness and hand feeling, and integrating them.

A main body portion 13 which occupies most of the base material 12 is gently curved such that the central portion bulges more toward the front side (upper side in FIG. 1A) than the peripheral portion. The base material 12 has a peripheral edge portion 14 around the main body portion 13. The peripheral edge portion 14 is curved toward the back surface of the base material 12 (lower side in FIG. 1A). The peripheral edge portion 14 has a plurality of linear portions 15, and a plurality of corner portions 16 which are located between the adjacent linear portions 15 to connect the both linear portions 15.

The base material 12 has a front surface 17 and a back surface 18. The back surface 18 has a flat boundary surface 18a at a boundary portion with the front surface 17. The boundary surface 18a is located at a position furthest away from the main body portion 13 in the peripheral edge portion 14 of the base material 12.

As the base material 12, an air-impermeable material having a vacuum hole formed therein or a material formed of a material having air permeability such as a woody material is used.

The skin 21 is made up of a main portion 22 which occupies most of the skin 21, and a distal end portion 23 around the main portion 22. The main portion 22 covers the front surface 17 of the base material 12, and the distal end portion 23 is wound around the back surface 18 of the base material 12.

As the skin 21, an air-impermeable synthetic resin sheet or a material lined with a cushion layer on the back surface of an air-impermeable synthetic resin sheet is used. For example, a laminated sheet material lined with polyethylene foam on the back surface of a TPO (thermoplastic olefin) sheet and excellent in soft feeling can be adopted.

Examples of the product with skin 11 having such a configuration include interior parts for automobiles such as a door trim.

<Manufacturing Apparatus 30>

Next, a manufacturing apparatus 30 used for manufacturing the product with skin 11 will be described.

Figure 2:
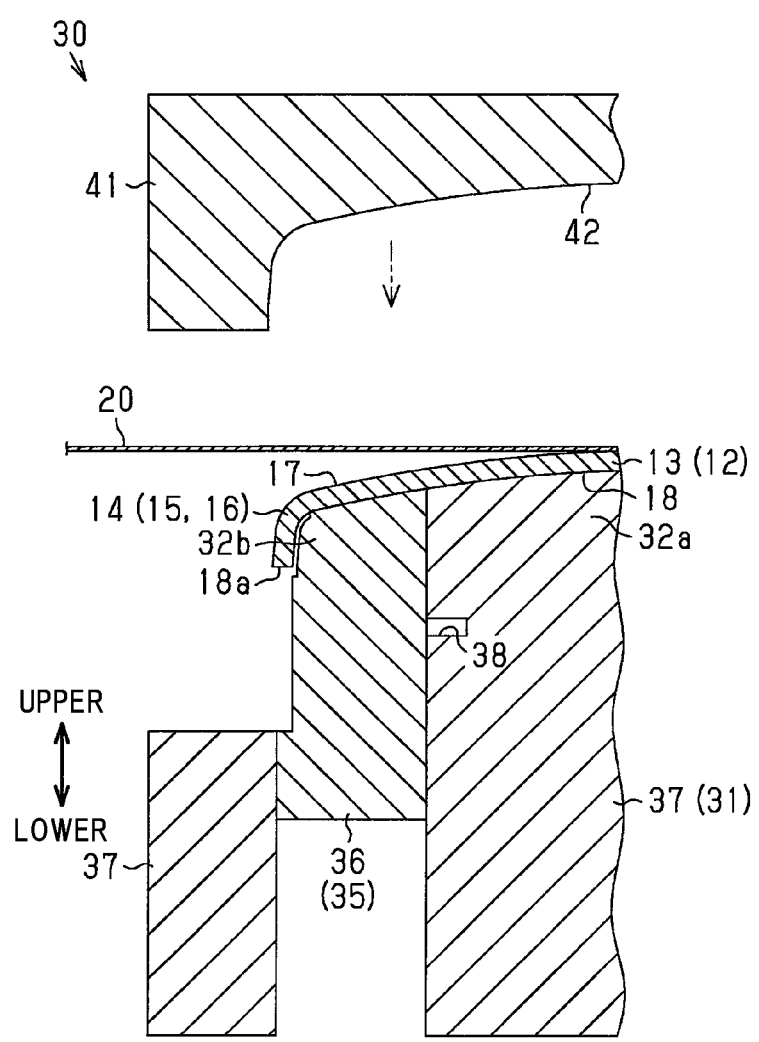
FIG. 2 is a partial cross-sectional view illustrating a shaping process in the first embodiment.

As illustrated in FIG. 2, the manufacturing apparatus 30 includes a vacuum forming die 31 having a vacuum suction mechanism (not illustrated), and an upper die 41 disposed above the vacuum forming die 31 so as to be movable up and down.

Protrusions 32a and 32b having shapes corresponding to the back surface 18 of the base material 12 are formed on an upper portion of the vacuum forming die 31. These protrusions 32a and 32b are portions to which the base material 12 is attached during the shaping process. The vacuum forming die 31 is provided with a winding mechanism 35 for winding the distal end portion 23 of the skin 21 around the back surface 18 of the base material 12. The winding mechanism 35 includes a plug 36 which forms a part of the vacuum forming die 31 and is capable of reciprocating in the vertical direction, which is a direction orthogonal to the boundary surface 18a of the base material 12. The plug 36 has the protrusion 32b at an upper end portion. When a portion of the vacuum forming die 31 different from the plug 36 is assumed to be a remaining portion 37, a part of the remaining portion 37 has the protrusion 32a at an upper end portion. In the remaining portion 37, a cutting groove 38 is formed at a position below the protrusion 32a and on the movement path of a trim blade 46 to be described later.

Figure 5:
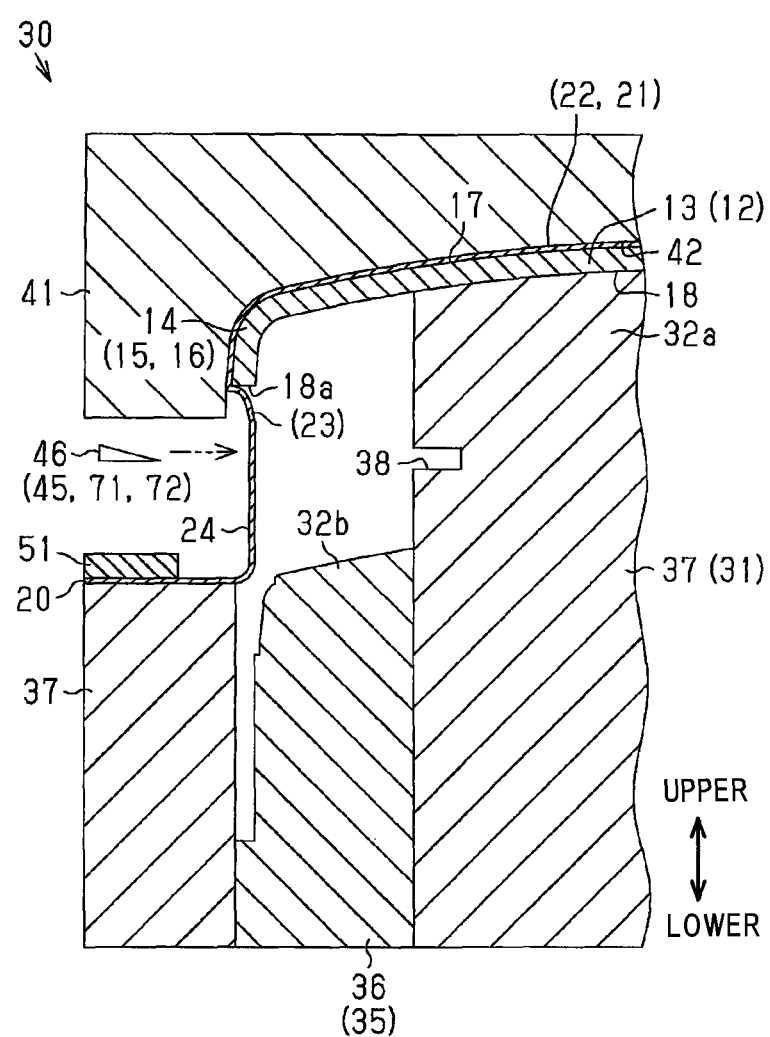
FIG. 5 is a partial cross-sectional view illustrating a trimming process in the first embodiment.

As illustrated in FIGS. 2 and 5, a recess 42 having a shape corresponding to the front surface 17 of the base material 12 is formed in the lower part of the upper die 41. The upper die 41 is provided with a cutting mechanism 45 for cutting the surplus portion 24 which is not in close contact with the front surface 17 of the base material 12 in the skin material 20 which is the material of the skin 21, so that the distal end portion 23 remains around the main portion 22 of the skin material 20. The cutting mechanism 45 has a plurality of trim blades 46 which is disposed along the peripheral edge portion 14 (see FIG. 1C) of the base material 12 and capable of reciprocating in a direction along the boundary surface 18a of the base material 12 (left-right directions in FIGS. 2 and 5). The reciprocation of each trim blade 46 is performed by an actuator such as an air cylinder.

Figure 4A:
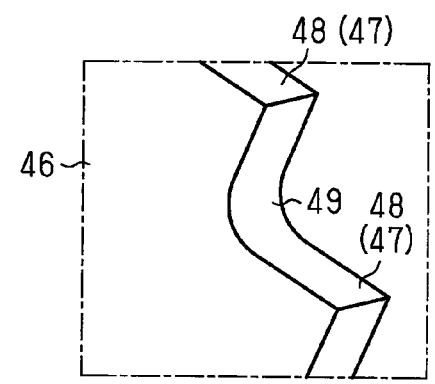
FIG. 4A is a partial perspective view of a trim blade according to the first embodiment.
Figure 4B:
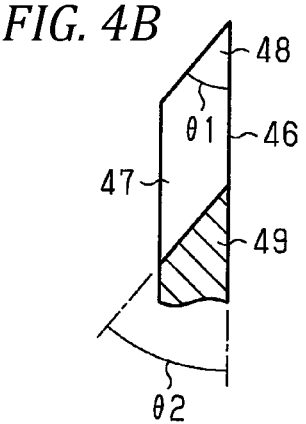
FIG. 4B is a partial cross-sectional view of a tooth in the trim blade of FIG. 4A.

As illustrated in FIGS. 4A and 4B, each trim blade 46 has a plurality of teeth 47 aligned in a row. The tip 48 of each tooth 47 is pointed. A valley portion 49 between the adjacent teeth 47 is formed in a curved state so that an angle θ2 of the blade is approximately the same as an angle θ1 of the blade at the tip 48 and is uniform irrespective of the part of the valley portion 49.

Figure 3:
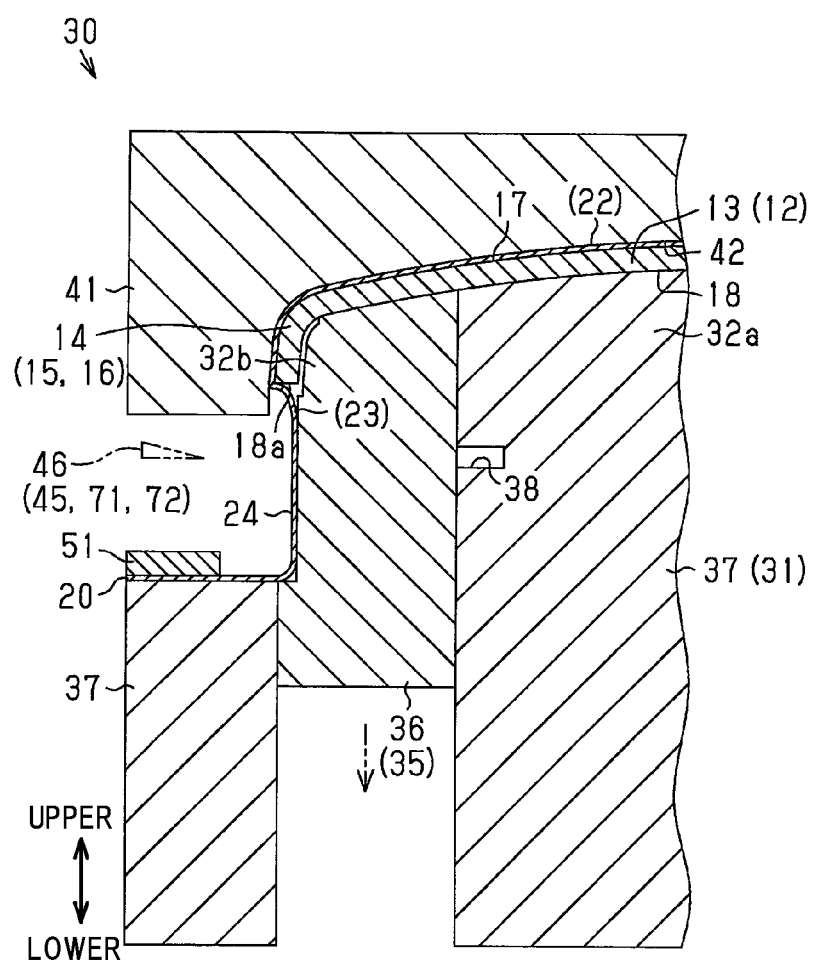
FIG. 3 is a partial cross-sectional view illustrating the shaping process in the first embodiment.

Further, as illustrated in FIG. 3, the manufacturing apparatus 30 is provided with a clamp frame 51 that ascends and descends in a state where the skin material 20 is gripped.

Next, as an action of the first embodiment, a method of manufacturing the product with skin 11 using the manufacturing apparatus 30 will be described together with effects.

In performing this method, the shaping process, the trimming process and the winding process are performed in order. Next, each process will be described.

<Shaping Process>

As illustrated in FIG. 2, prior to performing the shaping process, the base material 12 previously formed into a predetermined shape is prepared. In this base material 12, an adhesive is applied to places which will be covered with the skin 21. Also, the skin material 20 softened by being heated is prepared.

The upper die 41 is raised and separated upward from the vacuum forming die 31. The plug 36 is moved to a position where the base material 12 is supported from the back surface 18 so that the height of the protrusion 32b of the plug 36 is aligned with the height of the protrusion 32a of the remaining portion 37 of the vacuum forming die 31. This height is the height at which the upper end surface of the protrusion 32b is continuous with the upper end surface of the protrusion 32a.

The base material 12 is mounted on the protrusions 32a and 32b in which the heights are aligned as described above on the back surface 18 thereof. The base material 12 is supported from the back surface 18 by the plug 36 and the remaining portion 37 of the vacuum forming die 31.

The skin material 20 is disposed on the front surface 17 of the base material 12. As illustrated in FIG. 3, as the clamp frame 51 holding the skin material 20 is lowered, the skin material 20 is pressed to a position lower than the periphery of the protrusions 32a and 32b of the remaining portion 37 of the vacuum forming die 31. Further, the upper die 41 is moved (lowered) in the direction indicated by the two-dot chain line arrow in FIG. 2.

Further, as illustrated in FIG. 3, by operating the vacuum suction mechanism, when the skin material 20 is sucked through the vacuum forming die 31 and the base material 12, that is, when the air present between the base material 12 and the skin material 20 is discharged, the main portion 22 of the skin material 20 is deformed so as to be in close contact with the front surface 17 of the base material 12. The deformed skin material 20 adheres to the front surface 17 of the base material 12 with an adhesive.

<Trimming Process>

In the trimming process performed after the shaping process, the plug 36 is moved in the direction indicated by the two-dot chain line arrow in FIG. 3 in a state in which the base material 12 is attached to the remaining portion 37 of the vacuum forming die 31, and thus, the plug 36 is retracted to a position deviated from the movement path of the trim blade 46. Therefore, the plug 36 is hard to hinder cutting of the skin material 20 using the trim blade 46.

Figure 6:
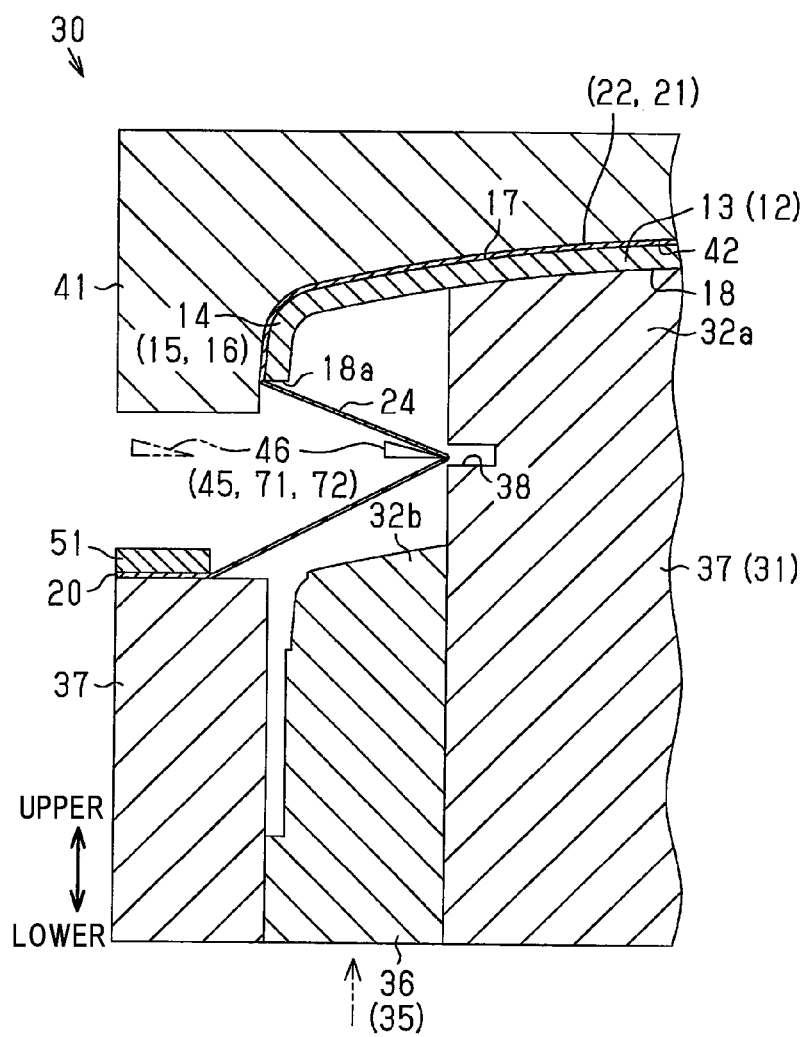
FIG. 6 is a partial cross-sectional view illustrating the trimming process in the first embodiment.

The cutting mechanism 45 operates and the trim blade 46 is moved along the boundary surface 18a of the base material 12 toward the side approaching the surplus portion 24 of the skin material 20, as indicated by the two-dot chain line arrow in FIG. 5. This movement is performed until the tip of the trim blade 46 enters the cutting groove 38 in the remaining portion 37 of the vacuum forming die 31, as illustrated in FIG. 6. In the process of this movement, each tooth 47 (see FIG. 4A) of the trim blade 46 is pressed against the surplus portion 24. By the pressing, the surplus portion 24 is cut so that the distal end portion 23 remains around the main portion 22 of the skin material 20. Thereafter, the trim blade 46 is moved (retracted) along the boundary surface 18a of the base material 12 to a side away from the cutting groove 38.

Figure 4C:
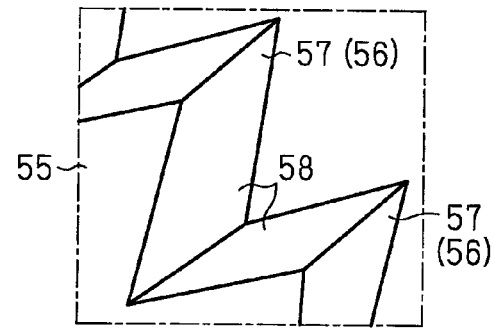
FIG. 4C is a partial perspective view of the trim blade of a comparative example.

Here, when as a trim blade 55 of a comparative example, as illustrated in FIG. 4C, a blade is used in which a plurality of teeth 56 forming a pointed triangular plate shape of a tip 57 are arranged in a row, and an angle of the blade at a valley portion 58 of each tooth 56 becomes larger toward the root portion of the tooth 56, there is the following risk. When each tooth 56 is pressed against the surplus portion 24 of the skin material 20 from the tip 57 to the valley portion 58, each tooth 56 enters while cutting the surplus portion 24. In the valley portion 58, as the root portion of the tooth 56 approaches, the surplus portion 24 is hard to be cut and be torn off, and there is a risk of generation of scraps.

In this respect, in the first embodiment, the trim blade 46 illustrated in FIG. 4A is used and each tooth 47 is pressed against the surplus portion 24 of the skin material 20. Then, in the valley portion 49, since the angle θ2 of the blade is uniform, the surplus portion 24 is uniformly cut irrespective of the portion of the tooth 47. The surplus portion 24 is also cleanly cut in the state in which the distal end portion 23 remains around the main portion 22 without tearing off the surplus portion 24 as in the tip 48 even in the valley portion 49. It is difficult for scraps to be generated due to torn off of the surplus portion 24.

Figure 7:
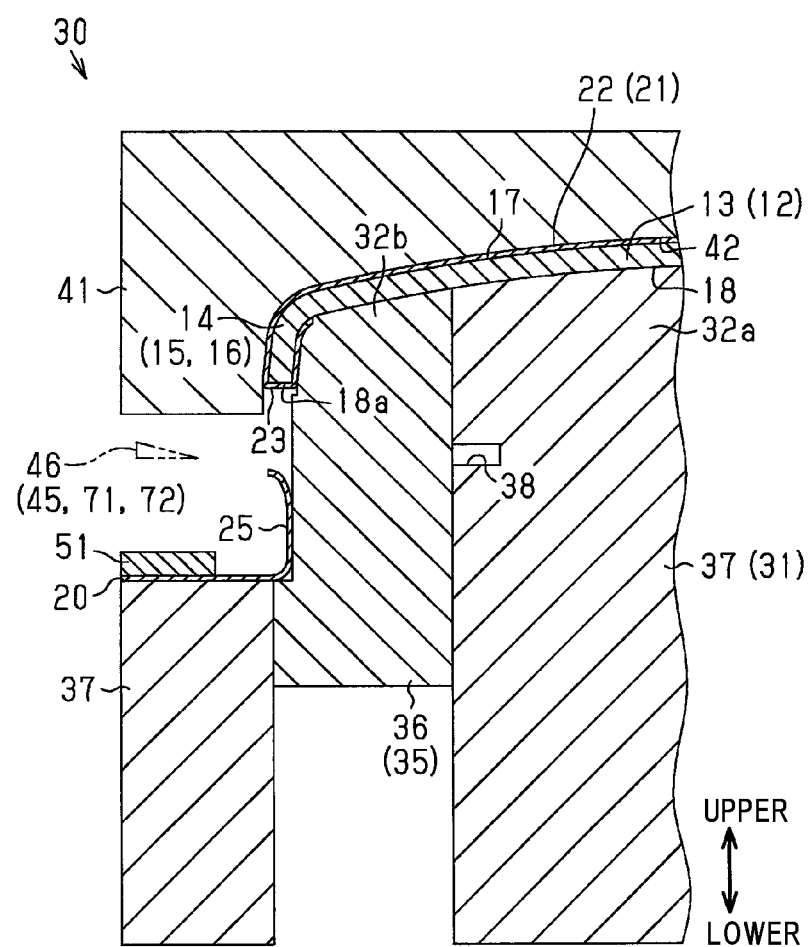
FIG. 7 is a partial cross-sectional view illustrating a winding process in the first embodiment.

Due to the cutting, the skin material 20 is separated into skin 21 including the main portion 22 adhering to the front surface 17 of the base material 12 and the distal end portion 23 around the main portion 22 thereof, and a remaining portion 25 pressed by the clamp frame 51 (see FIG. 7). In this way, an intermediate product is obtained in which the skin 21 adheres to the front surface 17 of the base material 12 in the main portion 22 and does not adhere to the base material 12 in the distal end portion 23.

<Winding Process>

In the winding process performed after the trimming process, the base material 12 in the intermediate product is maintained in a state of being attached to the remaining portion 37 of the vacuum forming die 31. The base material 12 continues to be supported from the back surface 18 by the remaining portion 37.

As illustrated in FIG. 7, the distal end portion 23 of the skin 21 is pressed upward by the winding mechanism 35 in a direction orthogonal to the boundary surface 18a of the base material 12. Specifically, the plug 36 is moved in the direction indicated by the two-dot chain line arrow in FIG. 6 to the position at which the base material 12 is supported from the back surface 18. During this movement, a part of the distal end portion 23 of the skin 21 is pressed toward the back surface 18 of the base material 12 by the plug 36. The distal end portion 23 is deformed so as to be in close contact with the back surface 18 including the boundary surface 18a of the base material 12. In this manner, when the distal end portion 23 is wound around the back surface 18 of the base material 12 and adheres to the back surface 18 of the base material 12 with the adhesive, as illustrated in FIGS. 1A to 1C, the product with skin 11 is obtained.

As described above, the shaping process, the trimming process and the winding process are performed in a state in which the base material 12 is attached to the vacuum forming die 31, in other words, using the common vacuum forming die 31. Therefore, unlike JP-A-2007-160595 which is performed using a dedicated jig provided separately from the vacuum forming die, the dedicated jig is unnecessary in the winding process. The cost for introducing the jig becomes unnecessary.

Further, in order to wind the distal end portion 23, it is not necessary to transfer the intermediate product subjected to the trimming process from the vacuum forming die 31 to a dedicated jig. The transferring process is unnecessary, and the number of manufacturing steps can be reduced accordingly.

Figure 8:
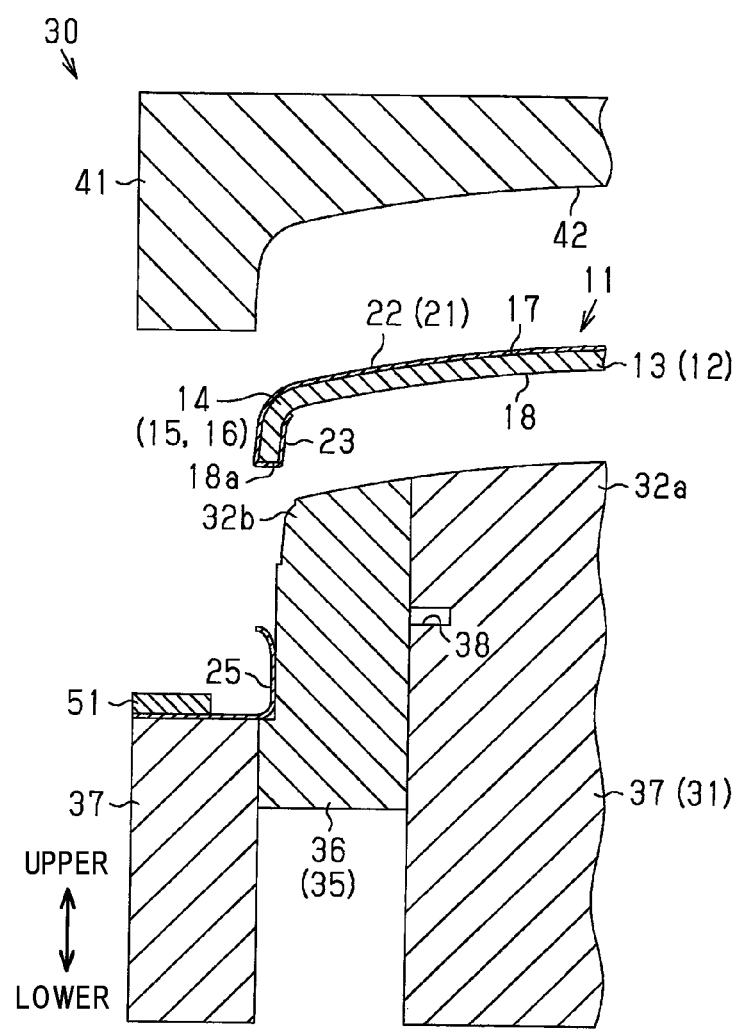
FIG. 8 is a partial cross-sectional view illustrating a state of extracting the product with skin from a vacuum forming die in the first embodiment.

After the winding process, as illustrated in FIG. 8, the upper die 41 is raised with a cutting mechanism (not illustrated). Then, the product with skin 11 is extracted from the protrusions 32a and 32b of the vacuum forming die 31.

According to the first embodiment, the following actions and effects can be obtained in addition to the above.

Figure 9A:
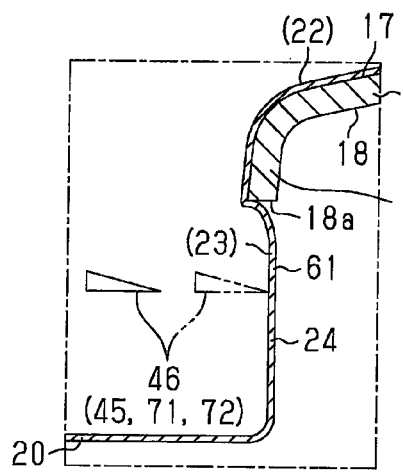
FIGS. 9A and 9B are diagrams illustrating a state of cutting a surplus portion of a skin material with the trim blade.
Figure 9B:
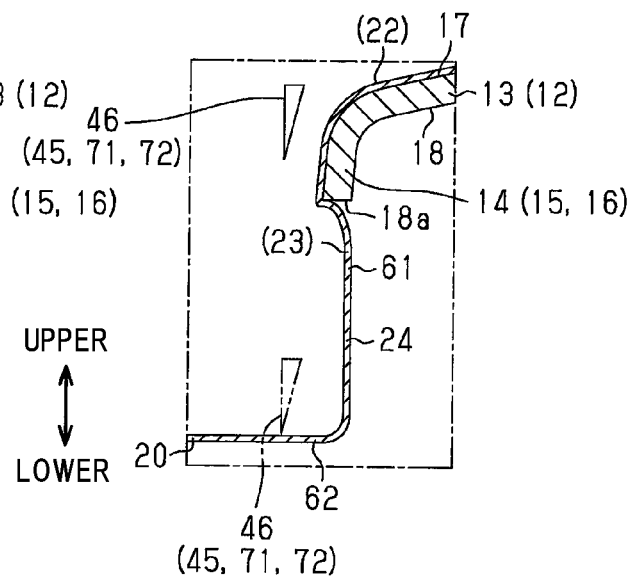

As a comparative example, as illustrated in FIG. 9B, even if the trim blade 46 is moved in the vertical direction which is a direction orthogonal to the boundary surface 18a of the base material 12, the surplus portion 24 of the skin material 20 can be cut so that the distal end portion 23 remains around the main portion 22. However, in this case, the distal end portion 23 includes a portion 61 adjacent to the main portion 22 and orthogonal to the boundary surface 18a, and a portion 62 adjacent to the portion 61 on the side opposite to the main portion 22 and parallel to the boundary surface 18a. The distal end portion 23 becomes longer by the parallel portion 62, and as a result, the distal end portion 23 may be excessively elongated.

In this respect, in the first embodiment, as illustrated in FIG. 9A, a blade capable of reciprocating in the direction along the boundary surface 18a of the base material 12 is used as a trim blade 46. Then, in the trimming process, the trim blade 46 is moved along the boundary surface 18a toward the side approaching the surplus portion 24 of the skin material 20 and pressed against the surplus portion 24. The surplus portion 24 is cut and the distal end portion 23 remains around the main portion 22. The distal end portion 23 is constituted only by the portion 61 adjacent to the main portion 22 and orthogonal to the boundary surface 18a. Therefore, there is no portion 62 parallel to the boundary surface 18a (see FIG. 9B), the distal end portion 23 becomes shorter by that amount, and it is possible to suppress the excessive elongation of the distal end portion 23.

Furthermore, if the surplus portion 24 of the skin material 20 is cut at a portion where the distal end portion 23 excessively becomes short, it becomes difficult to cause the distal end portion 23 to follow the shape of the back surface 18 including the boundary surface 18a of the base material 12, and it is difficult to properly wind the distal end portion 23 around the back surface 18 of the base material 12.

In this respect, in the first embodiment in which the trim blade 46 is moved in the direction along the boundary surface 18a of the base material 12, the height of the path along which the trim blade 46 is moved is not particularly restricted. Therefore, it is easy to cut the surplus portion 24 of the skin material 20 at a position where the distal end portion 23 has an appropriate length. In this way, in the first embodiment, it is easy to control the length of the distal unit 23.

By going through the trimming process, a cutting trace of a shape corresponding to the teeth of the trim blade remains on the distal end portion 23. In the first embodiment, as illustrated in FIG. 4A, the trim blade 46 having the curved valley portion 49 is used. Therefore, the width of the cutting trace (the interval between the crest portions and valley portions) becomes narrower than that in the comparative example using the trim blade 55 illustrated in FIG. 4C. This is because, the valley portions of the cutting trace have a pointed shape in the comparative example, whereas the valley portions have a curved shape, that is, a shape in which the tip of the pointed portion is removed in the first embodiment. As a result, cutting of a target portion of the surplus portion 24 is easier than in the comparative example, and the positional accuracy of the end surface of the distal end portion 23 can be enhanced.

Second Embodiment

Next, a second embodiment of the method of manufacturing a product with skin will be described with reference to FIGS. 10 and 11 in addition to the above FIGS. 5 and 6.
<Base Material 12>
The peripheral edge portion 14 around the main body portion 13 of the base material 12 includes a plurality of linear portions 15, and a plurality of corner portions 16 connecting the adjacent linear portions 15. In this respect, the second embodiment is common to the first embodiment. Further, each of the corner portions 16 is curved in an arc shape so as to bulge toward the side away from the main body portion 13. Each corner portion 16 has a circumferential length shorter than the length of any linear portion 15.
<Trim Blade>
A plurality of first trim blades 71 and a plurality of second trim blades 72 are used as a plurality of trim blades in the cutting mechanism 45. Each of the first trim blades 71 is to cut a portion of the surplus portion 24 of the skin material 20 corresponding to the linear portion 15 of the base material 12 so that the distal end portion 23 remains around the main portion 22. A portion of the first trim blade 71 that is formed by cutting a portion corresponding to the linear portion 15 having a relatively long length in the surplus portion 24 is divided into a plurality of portions. Further, each second trim blade 72 is to cut a portion of the surplus portion 24 of the skin material 20 corresponding to the corner portion 16 of the base material 12 so that the distal end portion 23 remains around the main portion 22 (see FIG. 5).
<Trimming Process>
In the second embodiment, the surplus portion 24 is cut by the second trim blade 72 while sucking the skin material 20 by evacuation, and thereafter cutting of the surplus portion 24 is performed by the first trim blade 71.

Matters other than the above are the same as those of the first embodiment. Therefore, the same reference numerals are given to the same elements as those described in the first embodiment, and the repeated description will not be provided.

Next, a method of manufacturing the product with skin 11 will be described. In performing the method, as in the first embodiment, the shaping process, the trimming process and the winding process are performed in order. Among these processes, the trimming process has the features of the second embodiment.

In the trimming process, as illustrated in FIG. 5, in a state in which the base material 12 is attached to the remaining portion 37 of the vacuum forming die 31, the plug 36 is retracted to a position deviated from the movement path of the first trim blade 71 and the second trim blade 72.

By operating the vacuum suction mechanism, the main portion 22 of the skin material 20 is sucked through the vacuum forming die 31 and the base material 12, and the surplus portion 24 of the skin material 20 is sucked through the vacuum forming die 31.

Figure 10:
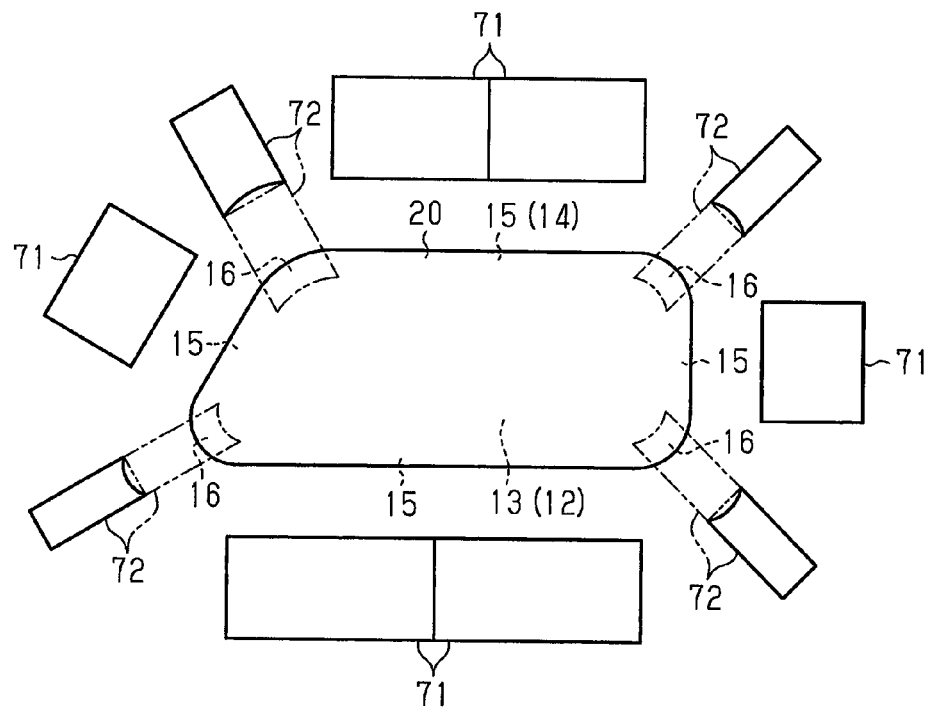
FIG. 10 is a schematic plan view illustrating a trimming process in a second embodiment of a method of manufacturing a product with skin.

In this state, as illustrated in FIGS. 5, 6, and 10, the second trim blade 72 is moved along the boundary surface 18a of the base material 12 toward a side approaching a portion of the surplus portion 24 of the skin material 20 corresponding to the corner portion 16 (see the two-dot chain line in FIG. 10). In the process of this movement, the second trim blade 72 is pressed against the surplus portion 24. By the pressing, a part of the surplus portion 24 is cut so that the distal end portion 23 remains around the main portion 22 of the skin material 20. At this stage, the portion of the surplus portion 24 corresponding to the linear portion 15 is not cut. Thereafter, the second trim blade 72 is retracted along the boundary surface 18a of the base material 12 (see the solid line in FIG. 10).

Figure 11:
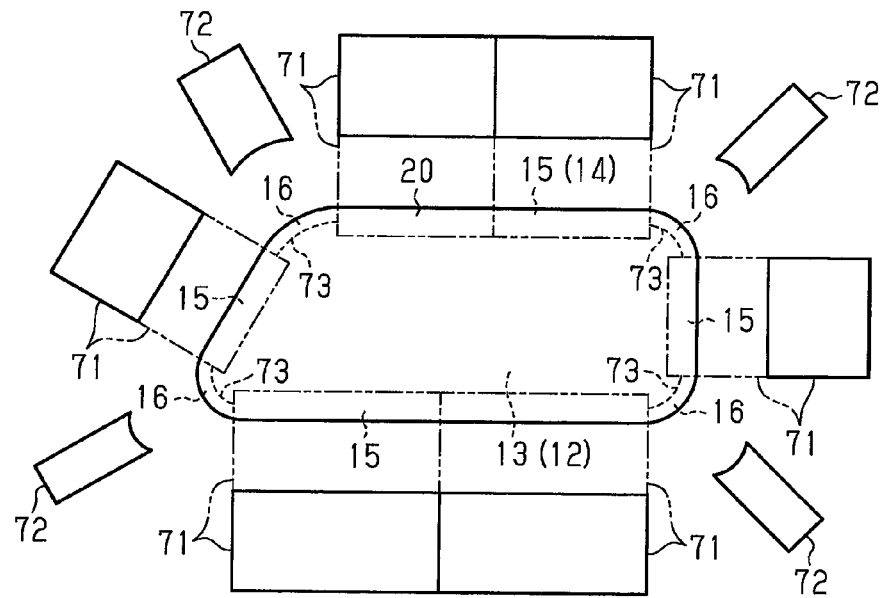
FIG. 11 is a schematic plan view illustrating the trimming process in the second embodiment.

After cutting using the second trim blade 72, as illustrated in FIGS. 5, 6, and 11, the first trim blade 71 is moved along the boundary surface 18a of the base material 12 toward a side approaching the position of the surplus portion 24 of the skin material 20 corresponding to the linear portion 15 (see the two-dot chain line in FIG. 11). In the process of this movement, the first trim blade 71 is pressed against the surplus portion 24. By the pressing, the uncut portion of the surplus portion 24 is cut so that the distal end portion 23 remains around the main portion 22 of the skin material 20. Thereafter, the first trim blade 71 is retracted along the boundary surface 18a of the base material 12 (see the solid line in FIG. 11).

Here, if cutting of the surplus portion 24 by the first trim blade 71 and cutting of the surplus portion 24 by the second trim blade 72 adjacent to the first trim blade 71 are performed at the same time, the surplus portion 24 can be cut from the skin material 20 in a short time so that the distal end portion 23 remains. Meanwhile, at the time of cutting, the first trim blade 71 and the second trim blade 72 may approach each other and interfere with each other.

In this respect, in the second embodiment, as described above, the cutting by the first trim blade 71 and the cutting by the second trim blade 72 are performed at different timings. Therefore, interference between the first trim blade 71 and the second trim blade 72 can be suppressed.

The cutting is performed in a state in which the skin material 20 is sucked by evacuation and the surplus portion 24 is pulled toward the back surface 18 of the base material 12.

However, when the surplus portion 24 is cut while being evacuated, air is considerably sucked from the cut portion, and the force of pulling the surplus portion 24 toward the back surface 18 of the base material 12 is lower than that before cutting. Therefore, the surplus portion 24 tries to return to the shape before being pulled by evacuation.

As the length of the cut portion increases, the amount of air to be sucked increases, and the degree of reduction in the force of pulling the surplus portion 24 toward the back surface 18 of the base material 12 increases. The length of the portion to be cut is shorter than that of the portion corresponding to the linear portion 15 at the portion corresponding to the corner portion 16 of the base material 12 in the surplus portion 24. This is because the circumferential length of each corner portion 16 is shorter than the length of any linear portion 15.

In this respect, in the second embodiment, as indicated by the broken line in FIG. 11, the cutting of the portion 73 corresponding to the corner portion 16 is performed first by the second trim blade 72. Thereafter, cutting of a portion corresponding to the linear portion 15 is performed by the first trim blade 71. Therefore, the force of pulling the surplus portion 24 toward the back surface 18 of the base material 12 before completion of the cutting of all the surplus portions 24 is hard to decrease as compared with a case where cutting by the first trim blade 71 is performed first and cutting by the second trim blade 72 is performed later. The surplus portion 24 becomes hard to return to the shape before being pulled by evacuation. Along with this, the distal end portion 23 formed by cutting the surplus portion 24 also approaches the back surface 18 of the base material 12.

Therefore, in the winding process performed subsequent to the trimming process, the distal end portion 23 of the skin 21 can be suitably wound around the back surface 18 of the base material 12 by the plug 36 of the winding mechanism 35.

Third Embodiment

Next, a third embodiment of the method of manufacturing a product with skin will be described with reference to FIG. 12.
<Base Material 12>

Plate-like ribs 75 for enhancing the rigidity of the base material 12 are integrally formed at a plurality of positions on the back surface 18 of the base material 12 different from the positions where the distal end portions 23 closely adheres. Further, in the back surface 18 of the base material 12, at a portion where the distal end portion 23 closely adheres, and a plurality of positions different from a position where the rib 75 is formed, the plate-like ribs 76 used for gripping the base material 12 in the winding process are integrally formed. Each of the ribs 75 and 76 protrudes to the side (back surface) away from the front surface 17 of the base material 12.
<Upper Die 41>

In the third embodiment, the manufacturing apparatus 30 not including the upper die 41 is used.
<Chuck Mechanism 77>

In the vacuum forming die 31, a chuck mechanism 77 is provided at a position close to the rib 76 of the base material 12. The chuck mechanism 77 includes a pair of arms 78 arranged to face in the thickness direction of the rib 76 (the left-right direction in FIG. 12). Each arm 78 is pivotably supported by a shaft 79 at one end (lower side in FIG. 12) and has a claw 81 at the other end (upper side in FIG. 12). In the chuck mechanism 77, as indicated by a solid line in FIG. 12, the arms 78 pivot in a direction in which the distance between the both claws 81 is narrowed so that the rib 76 is gripped by the both claws 81 from both sides in the thickness direction. Conversely, as indicated by a two-dot chain line in FIG. 12, the arms 78 pivot in a direction in which the distance between the both claws 81 is widened so that the gripping force of the rib 76 is weakened. Further, the chuck mechanism 77 includes a mechanism (not illustrated) for moving both the arms 78 in a state in which the rib 76 is gripped by the both claws 81 to a side (lower side) away from the rib 76.
<Shaping Process>

As described above, the base material 12 is coated with the adhesive at the places which will be covered with the skin 21. Although this illustration is omitted in the first embodiment and the second embodiment, the adhesive is indicated by reference numeral 82 in the third embodiment (see FIG. 12). The adhesive 82 is applied to the front surface 17 of the base material 12 and also applied to a portion of the back surface 18 of the base material 12 where the distal end portion 23 will be wound.
<Winding Process>

In the winding process, the operation of pressing and winding the distal end portion 23 by the winding mechanism 35 is performed in a state where the chuck mechanism 77 restricts movement of the base material 12 in the pressing direction.

Matters other than the above are the same as in the first embodiment. Therefore, the same reference numerals are given to the same elements as those described in the first embodiment, and the repeated description will not be provided.

Next, a method of manufacturing the product with skin 11 will be described. In performing this method, as in the first embodiment, the shaping process, the trimming process and the winding process are performed in order. Among these processes, the winding process has the features of the third embodiment.

Here, in order to firmly adhere the distal end portion 23 pressed by the plug 36 of the winding mechanism 35 to the back surface 18 of the base material 12 coated with the adhesive 82, it is important that the distal end portion 23 be strongly pressed against the base material 12.

Figure 12:
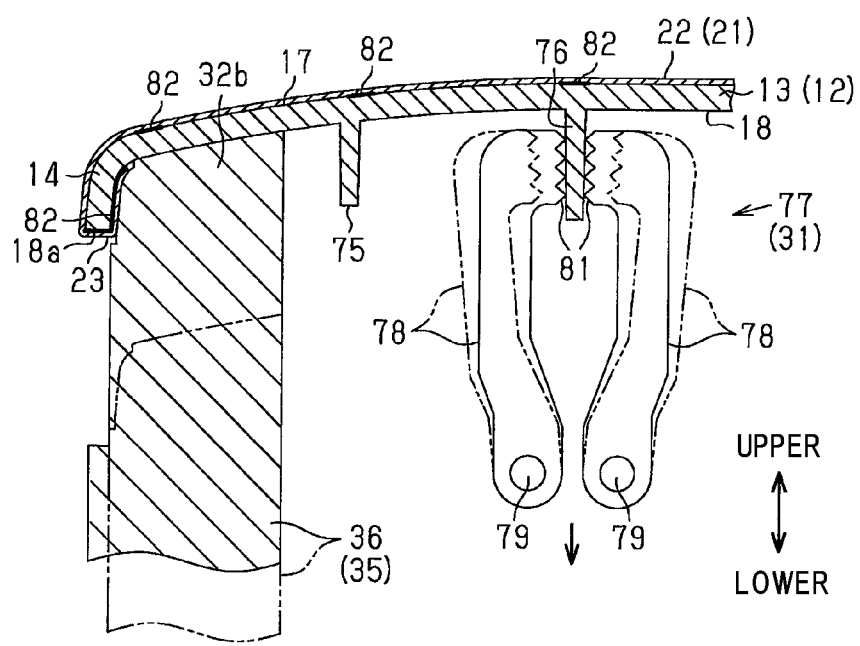
FIG. 12 is a partial cross-sectional view illustrating a winding process in a third embodiment of the method of manufacturing a product with skin.

In this regard, in the winding process of the third embodiment, as indicated by the solid line in FIG. 12, each arm 78 pivots in the direction in which the distance between the both claws 81 is narrowed in the chuck mechanism 77. The ribs 76 projecting from a plurality of positions on the back surface 18 of the base material 12 are gripped by both claws 81 of each arm 78 from both sides in the thickness direction. In this state, the plug 36 of the winding mechanism 35 indicated by the two-dot chain line in FIG. 12 is moved to a position where the base material 12 is supported from the back surface 18 as indicated by the solid line. At this time, the movement of the base material 12 in the direction (upward) in which the distal end portion 23 is pressed by the plug 36 is restricted. In this state, since a part of the distal end portion 23 is pressed toward the back surface 18 of the base material 12 by the plug 36, after being deformed along the back surface 18 including the boundary surface 18a of the base material 12, the part is strongly pressed against the base material 12. As a result, the distal end portion 23 can strongly adhere (be pressed) to the back surface 18 of the base material 12.

Furthermore, in the third embodiment, both arms 78 in a state in which the ribs 76 are gripped by the pair of claws 81 are moved to the side (lower side) away from the rib 76 as indicated by the arrow in FIG. 12. Therefore, as compared with the case where such movement is not performed, a part of the distal end portion 23 can firmly adhere (be pressed) to the back surface 18 of the base material 12.

Further, each of the above-described embodiments can also be provided as a modified example modified as follows.

As the plug 36, a plug made up of a single part may be used, or a plug divided into a plurality of parts along the peripheral part 14 (see FIG. 1C) of the base material 12 may be used. In the latter case, there is an advantage that the plug 36 can be moved at an optimum timing for each plug 36.

The timing (suction start timing of the skin material 20) of operating the vacuum suction mechanism and the timing (timing of suction stop of the skin material 20) of stopping the operation of the vacuum suction mechanism may be appropriately changed. For example, when the plug 36 is lowered, the operation of the vacuum suction mechanism may be stopped to be opened to the atmosphere.

The application site of the adhesive 82 on the front surface 17 of the base material 12 may be set at a plurality of positions separated from each other as illustrated in FIG. 12.

In the first and second embodiments, as in the third embodiment, the product with skin 11 may be manufactured by the manufacturing apparatus 30 not including the upper die 41.

A different type from the third embodiment may be used as the chuck mechanism 77 on condition that the movement of the base material 12 in the direction in which the distal end portion 23 is pressed by the winding mechanism 35 can be restricted.

Both arms 78 may be held at a position of gripping the ribs 76 without being moved to the side (lower side) away from the ribs 76.

The method of manufacturing a product with skin can also be appropriately applied to the case of manufacturing interior parts for automobiles different from the door trim as a product with skin.

The method of manufacturing the product with skin can also be appropriately applied to the case of manufacturing a product with skin different from automobile interior parts for automobiles.

What is claimed is:

1. A method of manufacturing a product with skin in which a main portion of skin covers a front surface of a base material, and a distal end portion around the main portion of the skin is wound around a back surface of the base material, the method comprising:
    attaching a preformed base material to a vacuum forming die on the back surface of the base material, disposing a skin material as a material of the skin on the front surface of the base material, and then sucking the skin material through the vacuum forming die and the base material to deform the main portion of the skin material so as to be in close contact with the front surface of the base material;
    cutting a surplus portion of the skin material not being in close contact with the front surface of the base material with a trim blade so that the distal end portion remains around the main portion, while keeping the base material in the state of being attached to the vacuum forming die, thereby forming the skin having the distal end portion; and
    winding the distal end portion of the skin around the back surface of the base material by a winding mechanism, while keeping the base material in the state of being attached to the vacuum forming die, wherein
    a material having a flat boundary surface at a boundary portion between a back surface and a front surface is used as the base material;
    a blade capable of reciprocating in a direction along the flat boundary surface is used as the trim blade; and
    when the skin having the distal end portion is formed, cutting is performed by moving the trim blade along the flat boundary surface toward a side approaching the surplus portion and pressing the trim blade against the surplus portion.

2. The method of manufacturing the product with skin according to claim 1, wherein:
    a peripheral edge portion of the base material includes a plurality of linear portions, and a plurality of curved corner portions connecting the adjacent linear portions and having a circumferential length shorter than the length of the linear portion,
    a first trim blade for cutting a portion of the surplus portion of the skin material corresponding to the linear portion of the base material, and a second trim blade for cutting a portion thereof corresponding to the corner portion of the base material are used as the trim blade, and
    when the skin having the distal end portion is formed, the surplus portion is cut by the first trim blade after cutting the surplus portion by the second trim blade while sucking the skin material by evacuation.

3. The method of manufacturing the product with skin according to claim 1, wherein
    when the distal end portion of the skin is wound around the back surface of the base material, the distal end portion is pressed in a direction orthogonal to the flat boundary surface by the winding mechanism, and the distal end portion is deformed to be in close contact with the back surface including the flat boundary surface of the base material, thereby winding the distal end portion.

4. The method of manufacturing the product with skin according to claim 3, wherein:
    the distal end portion of the skin is wound around the back surface of the base material in a state in which an adhesive is applied to a predetermined location of the back surface of the base material in which at least the distal end portion is wound; and
    when the distal end portion of the skin is wound around the back surface of the base material, the operation of pressing and winding the distal end portion by the winding mechanism is performed in a state in which the movement of the base material in a pressing direction is restricted.

5. The method of manufacturing the product with skin according to claim 4, wherein:
    a material having a rib formed at a location of the back surface different from a location where the distal end portion is closely contacts is used as the base material; and
    when the distal end portion of the skin is wound around the back surface of the base material, by gripping the rib by a chuck mechanism provided on the vacuum forming die, movement of the base material in a direction in which the distal end portion is pressed by the winding mechanism is restricted, and in this state, the distal end portion is pressed and wound.

6. The method of manufacturing the product with skin according to claim 3, wherein:
    a mechanism including a plug, which forms a part of the vacuum forming die and is capable of reciprocating in a direction orthogonal to the flat boundary surface, is used as the winding mechanism;
    when the main portion of the skin material is deformed, the plug is moved to a position where the base material is supported from the back surface;
    when the skin having the distal end portion is formed, the plug is retracted to a position deviated from a movement path of the trim blade; and
    when the distal end portion of the skin is wound around the back surface of the base material, the plug is moved to a position where the base material is supported from the back surface.

7. A method of manufacturing a product with skin in which a main portion of skin covers a front surface of a base material, and a distal end portion around the main portion of the skin is wound around a back surface of the base material, the method comprising:

attaching a preformed base material to a vacuum forming die on the back surface of the base material, disposing a skin material as a material of the skin on the front surface of the base material, and then sucking the skin material through the vacuum forming die and the base material to deform the main portion of the skin material so as to be in close contact with the front surface of the base material;

cutting a surplus portion of the skin material not being in close contact with the front surface of the base material with a trim blade so that the distal end portion remains around the main portion, while keeping the base material in the state of being attached to the vacuum forming die, thereby forming the skin having the distal end portion; and winding the distal end portion of the skin around the back surface of the base material by a winding mechanism, while keeping the base material in the state of being attached to the vacuum forming die, wherein a blade which has a plurality of teeth aligned in a row, and in which a tip of each tooth is pointed and valley portions between adjacent teeth are formed in a curved state such that an angle of the blade is uniform, is used as the trim blade, and when the skin having the distal end portion is formed, cutting is performed by pressing each tooth of the trim blade against the surplus portion.

\* \* \* \* \*